United States Patent
Boehm et al.

(10) Patent No.: US 10,152,592 B2
(45) Date of Patent: Dec. 11, 2018

(54) COMPILER ASSISTED PROTECTION AGAINST ARBITRARY CODE EXECUTION

(71) Applicant: International Business Machines Corporation, Armonk, NY (US)

(72) Inventors: Omer Y. Boehm, Haifa (IL); Yousef Shajrawi, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 14/965,939

(22) Filed: Dec. 11, 2015

(65) Prior Publication Data

US 2017/0169216 A1    Jun. 15, 2017

(51) Int. Cl.
| | |
|---|---|
| G06F 21/00 | (2013.01) |
| G06F 21/54 | (2013.01) |
| G06F 3/06 | (2006.01) |
| G06F 21/51 | (2013.01) |

(52) U.S. Cl.
CPC ............ *G06F 21/54* (2013.01); *G06F 3/0622* (2013.01); *G06F 3/0643* (2013.01); *G06F 3/0673* (2013.01); *G06F 21/51* (2013.01); *G06F 2221/033* (2013.01)

(58) Field of Classification Search
CPC ...... G06F 15/78; G06F 9/45533; G06F 12/04; G06F 8/443; G06F 9/30145; G06F 2201/88
See application file for complete search history.

(56) References Cited

U.S. PATENT DOCUMENTS

| | | | |
|---|---|---|---|
| 8,776,223 B2 | 7/2014 | Balakrishnan et al. | |
| 9,147,070 B2 | 9/2015 | Panchenko et al. | |
| 2013/0185787 A1* | 7/2013 | Chen | G06F 21/53 |
| | | | 726/16 |
| 2015/0047049 A1 | 2/2015 | Panchenko et al. | |
| 2015/0106872 A1 | 4/2015 | Hiser et al. | |

(Continued)

FOREIGN PATENT DOCUMENTS

| | | |
|---|---|---|
| WO | 2013174503 A1 | 11/2013 |
| WO | 2014210277 A1 | 12/2014 |

OTHER PUBLICATIONS

Anckaert et al., "Run-Time Randomization to Mitigate Tampering", IWSEC 2007, LNCS 4752, pp. 153-168, 2007, © Springer-Verlag Berlin Heidelberg 2007.

(Continued)

*Primary Examiner* — Ghazal B Shehni
(74) *Attorney, Agent, or Firm* — Isaac J. Gooshaw

(57) ABSTRACT

A method, computer program product, and computer system are provided. A processor receives an executable file for execution by an operating system, where the executable file includes a plurality of sections in a first order. A processor determines a second order that indicates a loading order for the plurality of sections, where the second order is distinct from the first order. A processor loads the plurality of sections of the executable file into a plurality of locations in memory of a device based on the second order. A processor resolves one or more memory references for the plurality of sections based on the plurality of locations in memory. A processor executes the plurality of sections of the executable file in the plurality of locations in memory.

20 Claims, 4 Drawing Sheets

(56) References Cited

U.S. PATENT DOCUMENTS

| | | | |
|---|---|---|---|
| 2015/0135313 A1* | 5/2015 | Wesie | G06F 9/445 726/22 |
| 2015/0143452 A1 | 5/2015 | Hamlen | |
| 2015/0356016 A1* | 12/2015 | Robertson | G06F 12/00 711/103 |
| 2016/0034687 A1 | 2/2016 | Rhee et al. | |
| 2016/0092674 A1 | 3/2016 | Hughes et al. | |

OTHER PUBLICATIONS

Bhatkar et al., "Efficient Techniques for Comprehensive Protection from Memory Error Exploits", 14th USENIX Security Symposium, vol. 14, pp. 255-270, USENIX Association Berkeley, CA, USA, © 2005, <http://dl.acm.org/citation.cfm?id=1251415&CFID=544364785&CFTOKEN=97215822>.
Forrest et al., "Building Diverse Computer Systems", In Proceedings of the 6th Workshop on Hot Topics in Operating Systems, IEEE Computer Society Press, Los Alamitos, CA, pp. 67-72, 1997.
Homescu et al., "librando: Transparent Code Randomization for Just-in-Time Compilers", CCS'13, Nov. 4-8, 2013, Berlin, Germany, 11 pages.
Kil et al., "Address Space Layout Permutation (ASLP): Towards Fine-Grained Randomization of Commodity Software", Proceedings of the 22nd Annual Computer Security Applications Conference (ACSAC'06), © 2006, IEEE, 10 pages.
Pappas, V., "Defending against Return-Oriented Programming", Academic Commons, Dissertation—Computer Science, Ph.D., Columbia University, 2015, 127 pages.
Pappas, V., "Defending against Return-Oriented Programming", Slideplayer, published Jocelin Briggs, Modified 5 months ago, 51 pages, <http://slideplayer.com/slide/4314077/>.
Pappas et al., "Practical Software Diversification Using In-Place Code Randomization", Moving Target Defense II: Application of Game Theory and Adversarial Modeling, Advances in Information Security 100, © Springer Science + Business Media New York 2013, pp. 175-202.
Pappas et al., "Smashing the Gadgets: Hindering Return-Oriented Programming Using In-Place Code Randomization", 2012 IEEE Symposium on Security and Privacy, pp. 601-615.
Pappas et al., "Transparent ROP Exploit Mitigation using Indirect Branch Tracing", SEC'13 Proceedings of the 22nd USENIX conference on Security, USENIX Association Berkeley, CA, USA ©2013, pp. 447-462, <http://dl.acm.org/citation.cfm?id=2534766.2534805>.
Roemer et al., "Return-Oriented Programming: Systems, Languages, and Applications", ACM Transactions on Information and System Security, vol. 15, No. 1, Article 2, Publication date: Mar. 2012, 34 pages.
Skowyra et al., "Systematic Analysis of Defenses against Return-Oriented Programming", RAID 2013, LNCS 8145, pp. 82-102, 2013, © Springer-Verlag Berlin Heidelberg.
Wartell et al., "Binary Stirring: Self-randomizing Instruction Addresses of Legacy x86 Binary Code", CCS'12, Oct. 16-18, 2012, Raleigh, North Carolina, Copyright 2012 ACM, 12 pages.
Zhang et al., "Practical Control Flow Integrity & Randomization for Binary Executables", 2013 IEEE Symposium on Security and Privacy, pp. 559-573.
"A detailed description of the Data Execution Prevention (DEP) feature in Windows XP Service Pack 2, Windows XP Tablet PC Edition 2005, and Windows Server 2003", Microsoft, Support, Article ID: 875352—Last Review: May 22, 2013 15:57:00—Revision: 15.0, Printed on: Sep. 9, 2015, 7 pages, <https://support.microsoft.com/en-us/kb/875352>.
"Address space layout randomization", Wikipedia, the free encyclopedia, last modified on Aug. 20, 2015, at 17:14, 5 pages, <https://en.wikipedia.org/wiki/Address_space_layout_randomization>.
"Data Execution Prevention", Wikipedia, the free encyclopedia, last modified on Mar. 9, 2015, at 09:19, 3 pages, <https://en.wikipedia.org/wiki/Data_Execution_Prevention>.
"Protecting Your Software", Microsoft Security Intelligence Report, Printed on: Sep. 9, 2015, 2 pages, <http://www.microsoft.com/security/sir/strategy/default.aspx#!section_3_3>.
"Return-oriented programming", Wikipedia, the free encyclopedia, last modified on Sep. 4, 2015, at 14:28, 3 pages, <https://en.wikipedia.org/wiki/Return-oriented_programming>.
"What is Data Execution Prevention?", Microsoft, Printed on: Sep. 9, 2015, 1 page, <http://windows.microsoft.com/en-us/windows-vista/what-is-data-execution-prevention>.
Pappas, V., "Dynamic Reconstruction of Relocation Information for Stripped Binaries", RAID 2914, LNCS 8688, pp. 68-87, 2014, Copyright Springer International Publishing Switzerland 2014.
IBM APPENDIX P., "List of IBM Patents or Patent Applications to be Treated as Related", Dated May 9, 2018, 2 pages.
Boehm et al., "Compiler Assisted Protection Against Arbitrary Code Execution", U.S. Appl. No. 15/974,749, Filed Date May 9, 2018, pp. 1-28.
Disclosed Anonymously, "ROP Prevention Using Encrypting Return Addresses", IP.com Prior Art Database Technical Disclosure, IPCOM000246196D, May 16, 2016, 6 pages.
Williams-King, David, "Binary shuffling: defeating memory disclosures attacks through re-randomization", University of British Columbia, Thesis/Dissertation, Jul. 2014, 65 pages, <https://open.library.ubc.ca/cIRcle/collections/ubctheses/24/items/1.0167580>.
Gupta et al., "Marlin: Mitigating Code Reuse Attacks Using Code Randomization", IEEE Transactions on Dependable and Secure Computing, vol. 12, No. 3, May/Jun. 2015, Date of publication Aug. 4, 2014, © 2014 IEEE, pp. 326-337.

* cited by examiner

COMPILER ASSISTED PROTECTION AGAINST ARBITRARY CODE EXECUTION

BACKGROUND OF THE INVENTION

The present invention relates generally to the field of arbitrary code execution, and more particularly to return oriented programming exploits.

Arbitrary code execution includes techniques for an attacker to execute any command of the attacker's choice on a target device. Typically, an attacker injects malicious code into a process in order to compromise the target device. Most arbitrary code execution attacks involve the execution of instructions, or machine code, used by the device. An attacker typically adds, or points to, a series of instructions to a running process in order to execute the arbitrary code. One exploit to use for execution of arbitrary code is return oriented programming. Return Oriented Programming (ROP) is a technique used to counter common exploit prevention strategies. In particular, ROP is useful for circumventing data execution prevention (DEP). Data execution prevention is a security feature of most operating systems that marks certain memory areas as executable and non-executable, allowing only data in the executable area to be executed. ROP allows for arbitrary code execution by compiling a payload via the chaining of several carefully chosen machine instruction sequences, called "gadgets". Each gadget typically ends in a return instruction and is located in a subroutine within the existing program and/or shared library code.

SUMMARY

Embodiments of the present invention provide a method, system, and program product to load a compiler-sectioned executable file. A processor receives an executable file for execution by an operating system, where the executable file includes a plurality of sections in a first order. A processor determines a second order that indicates a loading order for the plurality of sections, where the second order is distinct from the first order. A processor loads the plurality of sections of the executable file into a plurality of locations in memory of a device based on the second order. A processor resolves one or more memory references for the plurality of sections based on the plurality of locations in memory. A processor executes the plurality of sections of the executable file in the plurality of locations in memory.

DETAILED DESCRIPTION

Figure 1:
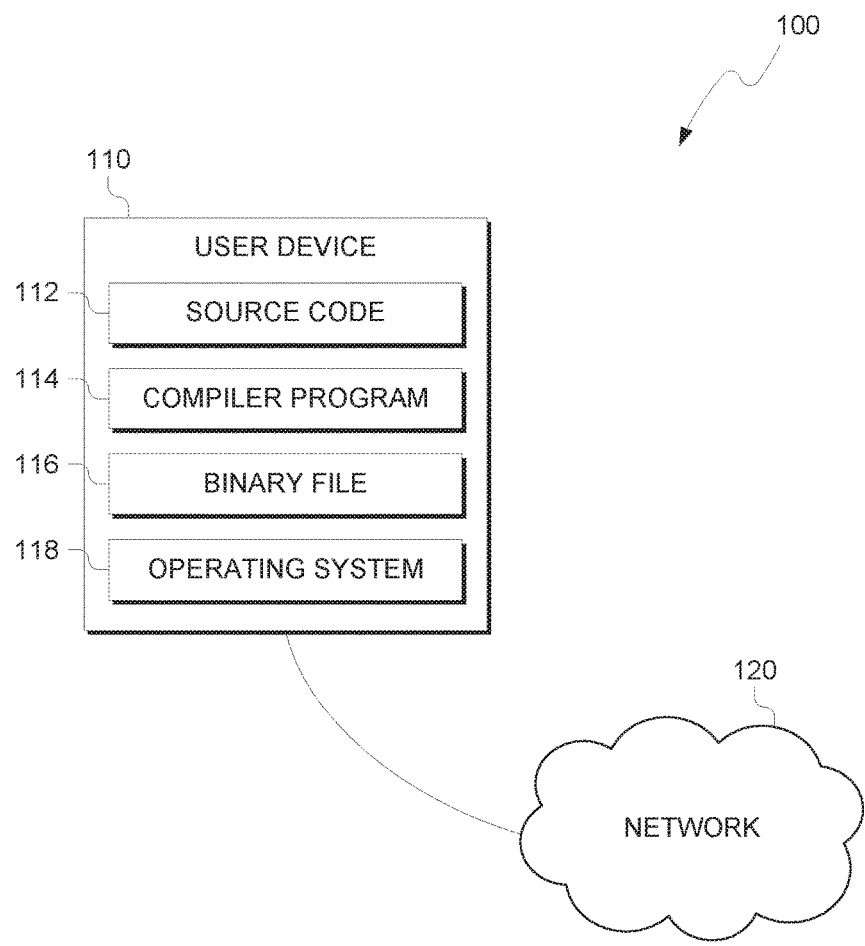
FIG. 1 is a functional block diagram illustrating a computing environment, in accordance with an embodiment of the present invention.

While solutions to preventing ROP attacks are known, they typically provide predictable approaches that can be easily compromised once discovered. One known solution is address space layout randomization (ASLR). ASLR randomizes the locations of key portions of a process, such as the process stack, allocated memory pool, and libraries. As such, ASLR relies upon on a probability that an attacker will fail to guess the locations of randomly loaded portions of the process. However, once a location is discovered, all randomized portions are compromised. Another known solution is instruction level randomization (ILR), where the instructions are stored in a random order. However, ILR introduces instability and additional overhead to the running process. Embodiments of the present invention recognize that by adding certain instructions during compiling of source code, instructions can be sectioned into blocks that can be randomized. By adding designated instructions to locations in a compiled binary, a loader utility of an operating system identifies the sections, places the sections in random locations of memory, and resolves the relative addressing in the binary based on the randomization. As such, embodiments of the present invention provide an arrangement of executable code that has an decreased degree of predictability, thereby increasing the degree of protection against arbitrary code execution. In some embodiments and scenarios, such an approach introduces little overhead and increases stability of execution.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating a computing environment, generally designated 100, in accordance with one embodiment of the present invention. Computing environment 100 includes user device 110 connected to network 120. User device 110 includes source code 112, compiler program 114, binary file 116, and operating system 118.

In various embodiments of the present invention, user device 110 is a computing device that can be a standalone device, a server, a laptop computer, a tablet computer, a netbook computer, a personal computer (PC), or a desktop computer. In another embodiment, user device 110 represents a computing system utilizing clustered computers and components to act as a single pool of seamless resources. In general, user device 110 can be any computing device or a combination of devices with access to source code 112 and binary file 116, and is capable of executing compiler program 114 and operating system 118. User device 110 may include internal and external hardware components, as depicted and described in further detail with respect to FIG. 4.

In this exemplary embodiment, source code 112, compiler program 114, binary file 116, and operating system 118 are stored on user device 110. However, in other embodiments, source code 112, compiler program 114, binary file 116, and operating system 118 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that will support communications between user device 110 and other devices (not shown) connected to network 120, in accordance with a desired embodiment of the present invention.

In various embodiments, compiler program 114 is a program that transforms source code 112 into machine code or machine-readable instructions. One of ordinary skill in the art will appreciate that source code 112 may be written in various languages and formats without deviating from the invention. Based on the content of source code 112, compiler program 114 generates binary file 116. Binary file 116 includes the machine-readable instructions generated by compiler program 114. As discussed herein, binary file 116 includes additional instructions or labels indicating various sections of machine instructions. Furthermore, binary file 116 includes a header portion with locations or pointers to the various sections of the machine-readable instructions included in binary file 116.

In various embodiments, operating system 118 includes a loader utility. When operating system 118 receives a command to execute binary file 116, the loader utility reads the header portion of binary file 116 to identify the various sections of machine instructions. The loader utility arranges the various sections into memory of user device 110. The loader utility selects a random permutation of the sections of machine instructions in binary file 116. For example, binary file 116 includes five sections of machine instructions. One permutation orders the sections as second, fifth, third, first and fourth. Another permutation orders the sections fourth, third, second, first and fifth. Based on the selected permutation, the loader utility of operating system 118 loads the sections into memory of user device 110.

In various embodiments, the loader utility determines available memory for each section. The loader utility assigns a location in memory for each section. Additionally, the loader utility resolves any references between sections based on the assignment. Once the sections of been assigned to memory and all references are resolved, operating system 118 begins execution of the loaded binary file 116. In various embodiments, subsequent loading of binary file 116 reorders and loads the sections into different locations of memory. As such, in some scenarios and embodiments, inserting arbitrary code into memory becomes more difficult for programs, which are seeking to compromise the target device, to predict. In some scenarios, the generation and execution of binary file 116 minimizes the overhead required to protect the target device from such programs.

In various embodiments, compiler program 114 generates binary file 116 based on source code 112. Based on the syntax and semantics of source code 112, compiler program 114 determines corresponding machine-readable instructions to perform the operations indicated in source code 112. In such embodiments and in certain scenarios, compiler program 114 determines sections of the source code based on one or both of the syntax and semantics of source code 112. Compiler program 114 adds instructions or labels to binary file 116 to indicate the identified sections. In some embodiments, compiler program 114 inserts a machine-readable instruction or instructions indicating the location of each identified section. In one embodiment, compiler program 114 inserts an instruction at the beginning of each section. In another embodiment, compiler program 114 inserts an instructions at the beginning and at the end of each section. In some embodiments, compiler program 114 inserts a label or other indication at the beginning and end of a section. One of ordinary skill in the art will appreciate that a variety of markings and indications of sections in binary file 116 may be used without deviating from the invention. Based on recognition of an indication, the loader utility and operating system 118 identify the various sections of machine-readable instructions of binary file 116, as determined by compiler program 114.

In some embodiments, compiler program 114 determines sections of source code 112 based on one or more of the syntax indicating functions, subroutines, and procedures indicated in source code 112 (e.g., the function "int sum(int input[ ])" and the encapsulated syntax and semantics). For example, upon compiling a declared function in source code 112, compiler program 114 inserts an instruction or label at the beginning of the location of the compiled machine-readable instructions in binary file 116. In some embodiments, compiler program 114 determines sections of source code 112 based on syntax indicating blocks of code (e.g., a bracketed or parenthetical portion of a loop). In some embodiments, source code 112 includes syntax and semantics to include a section instruction or label in the machine-readable instructions (e.g., inline assembly code included in source code 112).

In various embodiments, compiler program 114 generates binary file 116. Binary file 116 includes the machine-readable instructions generated by compiler program 114 based on the contents of source code 112. Furthermore, in an embodiment, binary file 116 includes instructions or labels that indicate the beginning and end of the determined sections. For example, compiler program 114 generates a set of machine instructions for a function in source code 112. Compiler program 114 inserts a machine-readable instruction indicating the start of a new section in binary file 116. In some embodiments, compiler program 114 includes a header portion to binary file 116 with one or both of the locations of the sections and instructions indicating the various sections of binary file 116. In general, the header provides the loader utility of operating system 118 a mechanism to identify the sections of binary file 116. In some embodiments, binary file 116 does not include a header. In such embodiments, the loader utility analyzes binary file 116 prior to loading for indications of sections (i.e., instructions or labels).

In various embodiments, compiler program 114 determines relative addressing for machine instructions in each section. The relative addressing indicates the location of references to other sections as stored in binary file 116. When the sections are loaded into memory by the loader utility, the loader utility resolves the relative addressing of the binary file with absolute addresses of the sections. For example, binary file 116 indicates two sections A and B. For section A, binary file 116 includes a 'jump' instruction to another instruction in section B. In binary file 116, the instruction includes a relative address (e.g., JUMP B+5, where B is the section and the jump point in the section is the fifth instruction the section, i.e. there are four addresses between the start and the fifth instruction). When the loader utility loads the sections into memory, the relative addressing is resolved with absolute addresses. Referring back to the example, the loader utility retrieves the assigned location of section B in memory and offsets the address by four to determine the address for the jump instruction. In some embodiments, the header of binary file 116 includes relocation information to resolve addressing when the loader utility loads various sections of binary file 116 into memory.

In some embodiments, the loader utility determines a random permutation or order of sections to load into memory. In some scenarios, the sections are contiguous (e.g., a loaded in a single range of addresses in memory. In other scenarios and embodiments, the sections are not contiguous and have memory addresses that are i) not allocated to binary file 116 that is loaded and ii) are located between sections. By randomly changing the order in which sections are loaded, the insertion of arbitrary code into the allocated executable memory for binary file 116 becomes increasingly difficult for programs seeking to compromise a computing device. In one embodiment, the loader utility generates a random number. Based on the random number, the loader utility determines the order to load the sections of binary file 116. For example, the loader utility identifies that ten sections are indicated in binary file 116. As such, the loader utility randomly selects one of the ten sections, followed by another section of the nine remaining sections, and repeats the process until the last section is selected.

In some embodiments, the header portion of binary file 116 includes more than one previously determined, also herein called pre-determined, permutations of load order for the sections. Upon loading binary file 116, the loader utility selects one of the permutations for a load order of the sections. By selecting a permutation, the loader utility also identifies a load order. By providing multiple previously determined, also herein called pre-determined, load orders, the loader utility provides a pseudo-random assignment to memory. With each subsequent loading of binary file 116, loader utility selects a different permutation from the header. In further embodiments, the loader utility randomly selects a permutation for the header of binary file 116. For example, based on a timestamp retrieved during the loading of binary file 116, the loader utility selects a pre-determined permutation from the header. Such an embodiments, further decreases overhead (e.g., only one random number and corresponding selection needs to be performed) while still randomizing the load order of the sections. In one embodiment, the order of pre-determined permutations, in the header, is randomized. As such, the selection of a given pre-determined permutation based on the timestamp varies from one instance of binary file 116 to another. In one embodiment, a subset of pre-determined permutations are randomly selected from a set of pre-determined permutations and are subsequently added to the header.

After the load utility loads the sections of binary file 116 to memory and the relative addresses are resolved based on the loading addresses of the sections, operating system 118 begins execution of the loaded binary file in memory. In some embodiments, after execution of the loaded binary file is completed, operating system 118 updates the header of binary file 116 such that subsequent loading of binary file 116 results in a different load order. For example, operating system 118 updates the selected load order used such that the same load order is not used in the next or additional (e.g., next five loads) loading of binary file 116.

By compiling source code 112 such that it includes an indication of various sections, compiler program 114 generates binary file 116. Binary file 116 provides machine-readable instructions that a sectioned into portions of the binary file that are capable of being loaded indifferent orders and location in memory of user device 110 by a loader utility of operating system 118. By changing the load order for each loading of binary file 116 and, by result, the relative locations of each section into memory, embodiments of the present invention provide a stable and low overhead solution to protect against arbitrary code execution exploits.

In some embodiments, operating system 118 receives an executable file for execution, wherein the executable file includes a plurality of sections in a first order. A loader utility of operating system 118 determines a second order that indicates a loading order for the plurality of sections, where the second order is distinct from the first order. The loader utility of operating system 118 loads the plurality of sections of the executable file into a plurality of locations in memory of a device based, at least in part, on the second order. The loader utility of operating system 118 resolves one or more memory references for the plurality of sections based, at least in part, on the plurality of locations in memory. The operating system 118 executes the plurality of sections of the executable file in the plurality of locations in memory.

In some embodiments, the load order is based, at least in part, on a random selection of the plurality of sections. In some embodiments, the load order is based, at least in part, on a selection of a predetermined permutation of the plurality of sections. In some embodiments, in response to a selection of the predetermined permutation of the plurality of sections, operating system 118 update the executable file with an indication of a use of the predetermined permutation for load order, wherein a subsequent execution of the executable file removes the predetermined permutation from selection.

In some embodiments, the plurality of sections of the executable file correspond to one or more following statements in a source code file: (i) one or more method declaration statements; (ii) one or more code block statements; or (iii) one or more user-designated statements. In some embodiments, the plurality of sections of the executable file are indicated by a pre-determined machine-readable instruction. In some embodiments, the plurality of sections of the executable file are indicated by a pre-determined label.

Figure 2:
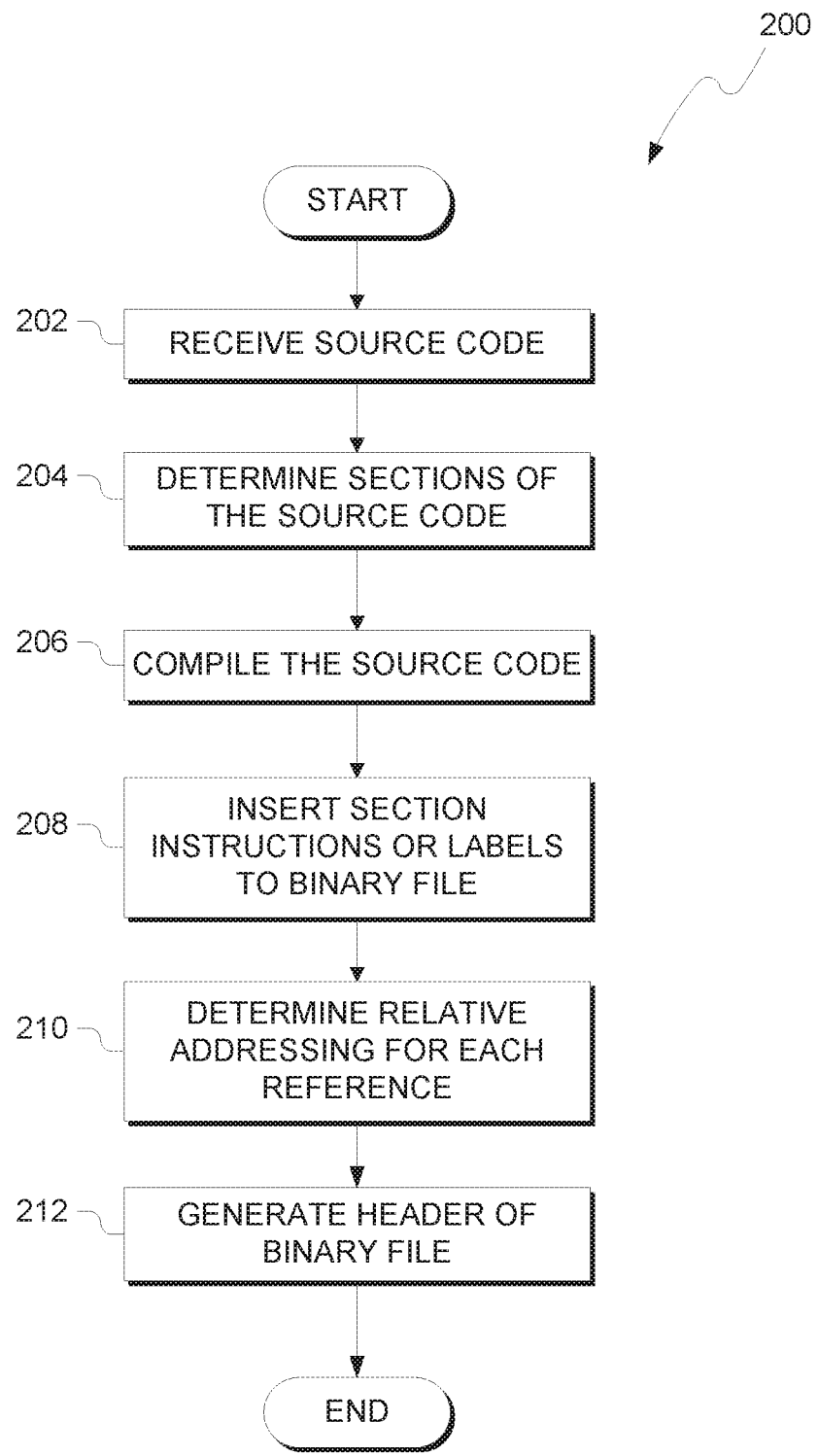
FIG. 2 illustrates operational processes of a compiler program, on a computing device within the environment of FIG. 1, in accordance with an embodiment of the present invention.

FIG. 2 illustrates operational processes of compiler program 114, generally designated 200. In process 202, compiler program 114 receives source code 112. Source code 112 includes syntax of a high-level programming language to be compiled into machine-readable instructions. In some embodiments and scenarios, source code 112 includes one or more other source code file or libraries to be included in the compiled executable. In process 204, compiler program 114 determines the sections of source code 112. In some embodiments, compiler program 114 determines the sections of the source code 112 based on the syntax or semantics of the high-level programming language used in source code 112. For example, compiler program 114 determines the location of functions in source code 112 based on the syntax, such as "for" loop written in source code 112 or bracketed portions of source code 112, or semantics, such as a method declaration and corresponding code. As another example, source code 112 includes user-designated high level programming instruction to insert labels or machine instructions at certain places in source code 112 that is compiled.

In process 206, compiler program 114 compiles the source code. Based on the syntax and semantic statements of source code 112, compiler program 114 generates corresponding machine-readable instructions as binary file 116. One of ordinary skill in the art will appreciate that any compilation techniques or methods may be used for compiling source code 112 into binary file 116 without deviating from the invention. In process 208, compiler program 114 inserts additional instructions or labels indicating the location of the sections, as determined in process 204, in binary file 116. For example, compiler program 114 translates the syntax and semantics of a sectioned function to machine-readable instructions. In some scenarios, compiler program 114 inserts an instruction before the corresponding instructions of the sectioned function in binary file 116. In other scenarios, compiler program 114 inserts labels at locations in binary file 116 corresponding with the sectioned and compiled functions. Such labels are not "machine-readable" per se (e.g., the processor does not interpret the byte code as a inherit function of the processor), but a loader utility of operating system 118 identifies the labels and performs the permutated loading of the sections, as discussed herein.

In process 210, compiler program 114 determines the relative addresses of references to other instructions in binary file 116. Compiler program 114 determines a relative address to the referenced instruction corresponding to the location with the section based on i) the section the reference is pointing to and ii) an offset of the section. For example, compiler program 114 determines two sections in source code 112. The resulting compiled instructions of the first section reference an instruction in the second section (e.g., a jump instruction in the first section referencing an instruction in the second section. Based on the beginning of the location of the second section in binary file 116, compiler program 114 determines an identifier for the section to include in the relative address (e.g., "A" or "01"). Furthermore, based on the location of the referenced instruction in the section, compiler program 114 determines an offset for the identifier (e.g., if the referenced instruction is the seventh instruction of the section, then compiler program 114 determines an offset of six, to account for the first instruction's location in binary file 116). In various embodiments, when a loader utility of operating system 118 loads binary file 116 for execution, the loader utility randomly or pseudo-randomly assigns the sections to different locations in memory of user device 110. As such, the initial address assigned to each section is identified by the loader utility. For any relative reference, the loader utility resolves the relative reference to an absolute reference (e.g., a corresponding memory address with the referenced machine instruction) by adding the offset to the location of the section in memory of user device 110.

In some embodiments, compiler program 114 generates a header portion of binary file 116 (process 212). In some scenarios and embodiments, the header includes the location in binary file 116 of each section. As such, when loaded into memory, a loader utility identifies the various sections of binary file 116. In other embodiments, the loader utility analyzes the instructions or labels in binary file 116 to determine the sections of binary file 116 without the presence of the header. In some scenarios and embodiments, the header includes relocation information to resolve relative addressing of binary file 116 as determined in process 210. In some scenarios and embodiments, the header includes randomization information. In one scenario, randomization information includes a set of permutations or orders of sections to be loaded into memory. In embodiments without pre-determined permutations, the loader utility randomly selects the order of sections upon loading binary file 116. In another scenario, the randomization information includes previous loading configurations or information indicative thereof. Upon subsequent loading of the binary file 116, the header indicates previous loading orders. The loader utility excludes a previous loading order from being used as a subsequent loading order of a binary file. In some scenarios, such an approach increases the difficulty for potential arbitrary code exploits to determine the location of each loaded section by.

Figure 3:
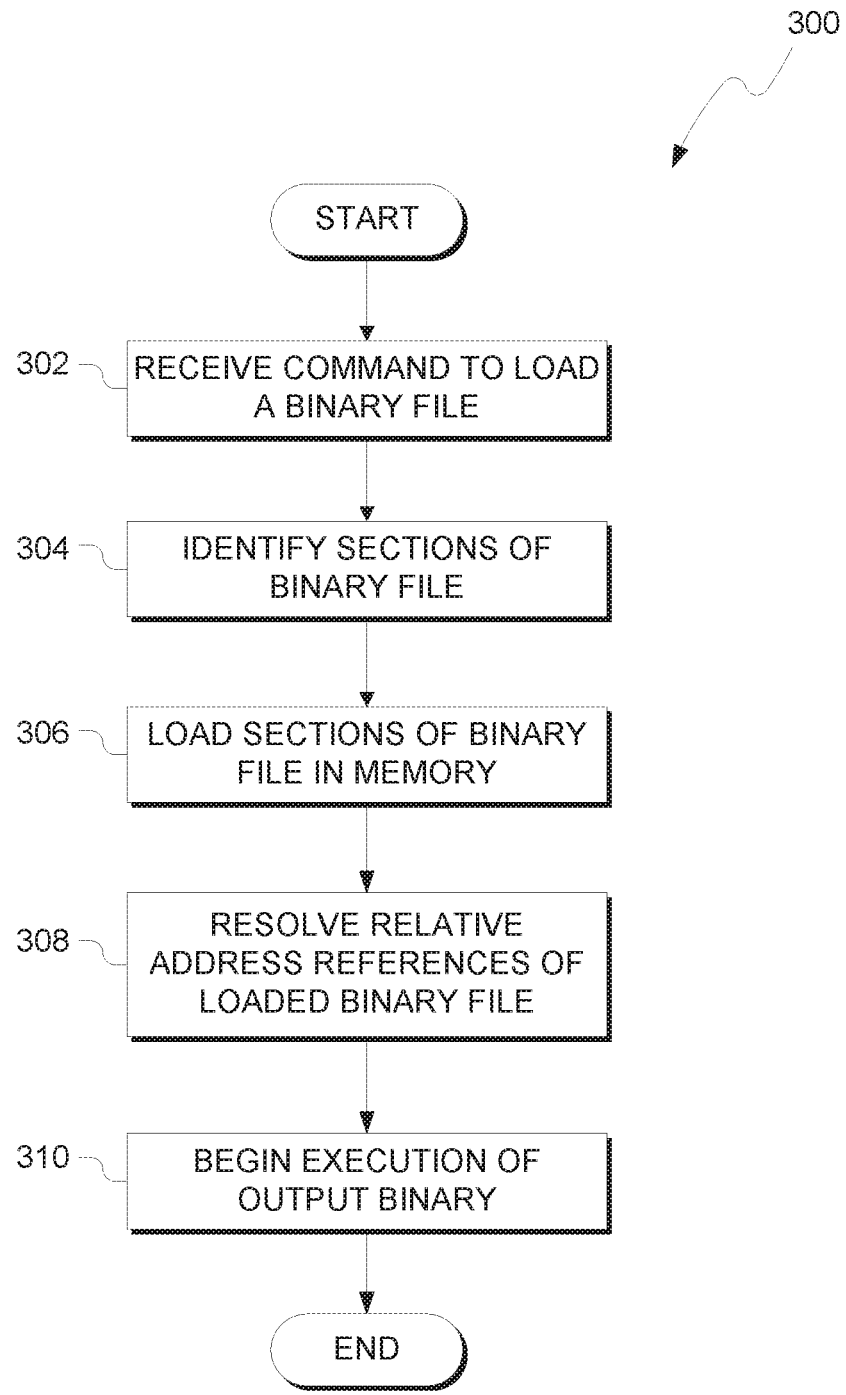
FIG. 3 illustrates operational processes of an operating system, on a computing device within the environment of FIG. 1, in accordance with an embodiment of the present invention.

FIG. 3 illustrates operational processes of operating system 118. In process 302, operating system 118 receives a command to execute binary file 116. In process 304, a loader utility of operating system 118 identifies the sections of binary file 116. In some embodiments, the loader utility identifies sections of binary file 116 based on header information of binary file 116. In other embodiments, the loader utility identifies sections based on instructions or labels in binary file 116. The loader utility reads each instruction of binary file 116. When a designated instruction or label indicating a section is identified, the loader utility identifies the corresponding section.

In process 306, the loader utility loads the sections into memory of user device 110. The loader utility determines a permutation or loading order of the sections. In some embodiments and scenarios, the loader utility randomly selects a permutation of sections of binary file 116 for a load order. A permutation is an ordered selection of sections without replacement. For each selection, the loader utility assign a uniform probability distribution to the remaining sections (e.g., each of ten sections is assigned a one-tenth probability weight). When a section is selected, the section is removed (e.g., not replaced) from the possible selections and the probability distribution is updated to reflect the remaining sections for selection (e.g., one-tenth to one-ninth after the first selection). One of ordinary skill in the art that any random sampling method may be used without deviating from the invention.

In other embodiments and scenarios, the header of binary file 116 indicates a random or pseudo-random process for a load order or permutation of sections of machine code of binary file 116. For example, the header includes various predetermined load orders. The loader utility selects a pre-determined load order from the header. Upon subsequent loading of binary file 116, the loader utility selects a different pre-determined load order. In another embodiment, the header includes instructions or other indicative information for a random selection of sections when loading into memory. In such embodiments where a header indicates load order permutation or random selection techniques, binary file 116, or header portion of binary file 116, is signed or otherwise encrypted to prevent reading from unauthorized programs or sources.

In process 308, the loader utility resolves the relative addressing of the loaded sections of binary file 116 based on the location in memory the sections are loaded. For example, binary file 116 includes a relative address scheme that indicates the section a reference is located in and an offset indicating the instruction's location in the referred section. The loader utility identifies the memory location of the loaded section. Based on the location of the loaded section, the loader utility resolves the relative reference to an absolute reference based on an offset associated with the location of the referred instruction in the section. For example, a section, labeled section A, is loaded at memory location 0x0C41. Therefore, the first instruction of section A is loaded at 0x0C41. In this example, another section references the fourth instruction in the section. Binary file 116 includes a relative reference to the section and the offset (i.e., JMP(A0003), where A is a reference to the section and 0003 is an offset from the memory address of the first instruction). The loader utility retrieves the memory location of the section (i.e., 0x0C41) and adds the offset to the retrieved location (i.e., 0x0C44), resolving the relative address to an absolute address. Once all sections of binary file 116 are loaded in memory of user device 110, operating system 118 begins execution of the loaded binary file 116 (process 310). In some embodiments and scenarios, operating system 118 updates the header of binary file 116 after loading or execution finishes to reflect the selected permutation of sections. The update provides a record of previous permutations. Upon subsequent loading, the loader utility of operating system 118 selects different permutations of section load order than previous permutations. As such, the location and references upon subsequent loads of binary file 116 will vary and provide additional protections against arbitrary code execution exploits.

Figure 4:
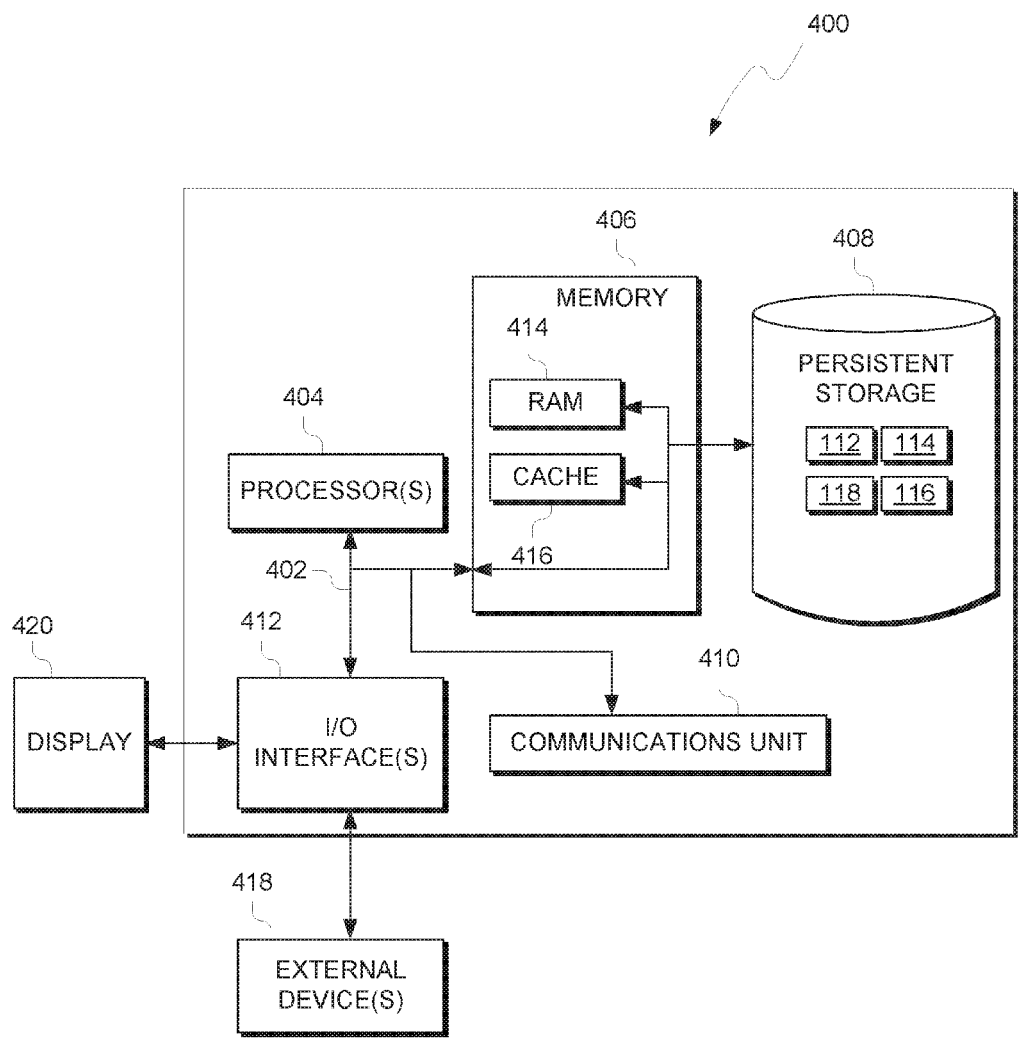
FIG. 4 depicts a block diagram of components of a computing device executing a compiler program or an operating system, in accordance with an exemplary embodiment of the present invention.

FIG. 4 depicts a block diagram, 400, of components of user device 110, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

User device 110 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Source code 112, compiler program 114, binary file 116, and operating system 118 are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of network 120. In these examples, communications unit 410 includes one or more network interface cards. Communications unit 410 may provide communications through the use of either or both physical and wireless communications links. Source code 112, compiler program 114, binary file 116, and operating system 118 may be downloaded to persistent storage 408 through communications unit 410.

I/O interface(s) 412 allows for input and output of data with other devices that may be connected to user device 110. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., source code 112, compiler program 114, binary file 116, and operating system 118, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that some term(s) may be subject to trademark rights in various jurisdictions throughout the world and are used here only in reference to the products or services properly denominated by the marks to the extent that such trademark rights may exist.

What is claimed is:

1. A method comprising:
   receiving, by one or more processors, an executable file for execution by an operating system, wherein the executable file includes a plurality of sections in a first order;
   determining, by the one or more processors, a second order that indicates a loading order for the plurality of sections, wherein the second order is distinct from the first order;
   loading, by the one or more processors, the plurality of sections of the executable file into a plurality of locations in memory of a device based, at least in part, on the second order;
   resolving, by the one or more processors, one or more memory references for the plurality of sections based, at least in part, on the plurality of locations in memory; and
   executing, by the one or more processors, the plurality of sections of the executable file in the plurality of locations in memory.

2. The method of claim 1, wherein the load order is based, at least in part, on a random selection of the plurality of sections.

3. The method of claim 1, wherein the load order is based, at least in part, on a selection of a predetermined permutation of the plurality of sections.

4. The method of claim 3, the method further comprising:
   responsive to a selection of the predetermined permutation of the plurality of sections, updating, by the operating system, the executable file with an indication of a use of the predetermined permutation for load order, wherein a subsequent execution of the executable file removes the predetermined permutation from selection.

5. The method of claim 1, wherein the plurality of sections of the executable file correspond to one or more following statements in a source code file: (i) one or more method declaration statements; (ii) one or more code block statements; or (iii) one or more user-designated statements.

6. The method of claim 5, wherein the plurality of sections of the executable file are indicated by a pre-determined machine-readable instruction.

7. The method of claim 5, wherein the plurality of sections of the executable file are indicated by a pre-determined label.

8. A computer program product comprising:
   one or more computer-readable storage media and program instructions stored on the one or more computer-readable storage media, the program instructions comprising:
   program instructions to receive an executable file for execution by an operating system, wherein the executable file includes a plurality of sections in a first order;
   program instructions to determine a second order that indicates a loading order for the plurality of sections, wherein the second order is distinct from the first order;

program instructions to load the plurality of sections of the executable file into a plurality of locations in memory of a device based, at least in part, on the second order;

program instructions to resolve one or more memory references for the plurality of sections based, at least in part, on the plurality of locations in memory; and program instructions to execute the plurality of sections of the executable file in the plurality of locations in memory.

9. The computer program product of claim 8, wherein the load order is based, at least in part, on a random selection of the plurality of sections.

10. The computer program product of claim 8, wherein the load order is based, at least in part, on a selection of a predetermined permutation of the plurality of sections.

11. The computer program product of claim 10, the program instructions further comprising:

responsive to a selection of the predetermined permutation of the plurality of sections, updating, by the operating system, the executable file with an indication of a use of the predetermined permutation for load order, wherein a subsequent execution of the executable file removes the predetermined permutation from selection.

12. The computer program product of claim 8, wherein the plurality of sections of the executable file correspond to one or more following statements in a source code file: (i) one or more method declaration statements; (ii) one or more code block statements; or (iii) one or more user-designated statements.

13. The computer program product of claim 12, wherein the plurality of sections of the executable file are indicated by a pre-determined machine-readable instruction.

14. The computer program product of claim 12, wherein the plurality of sections of the executable file are indicated by a pre-determined label.

15. A computer system comprising:

one or more computer processors;

one or more computer readable storage media; and program instructions stored on the computer readable storage media for execution by at least one of the one or more processors, the program instructions comprising:

program instructions to receive an executable file for execution by an operating system, wherein the executable file includes a plurality of sections in a first order;

program instructions to determine a second order that indicates a loading order for the plurality of sections, wherein the second order is distinct from the first order;

program instructions to load the plurality of sections of the executable file into a plurality of locations in memory of a device based, at least in part, on the second order;

program instructions to resolve one or more memory references for the plurality of sections based, at least in part, on the plurality of locations in memory; and program instructions to execute the plurality of sections of the executable file in the plurality of locations in memory.

16. The computer system of claim 15, wherein the load order is based, at least in part, on a random selection of the plurality of sections.

17. The computer system of claim 15, wherein the load order is based, at least in part, on a selection of a predetermined permutation of the plurality of sections.

18. The computer system of claim 17, the program instructions further comprising:

responsive to a selection of the predetermined permutation of the plurality of sections, updating, by the operating system, the executable file with an indication of a use of the predetermined permutation for load order, wherein a subsequent execution of the executable file removes the predetermined permutation from selection.

19. The computer system of claim 15, wherein the plurality of sections of the executable file correspond to one or more following statements in a source code file: (i) one or more method declaration statements; (ii) one or more code block statements; or (iii) one or more user-designated statements.

20. The computer system of claim 19, wherein the plurality of sections of the executable file are indicated by a pre-determined machine-readable instruction.

* * * * *